United States Patent Office 2,964,968
Patented Dec. 20, 1960

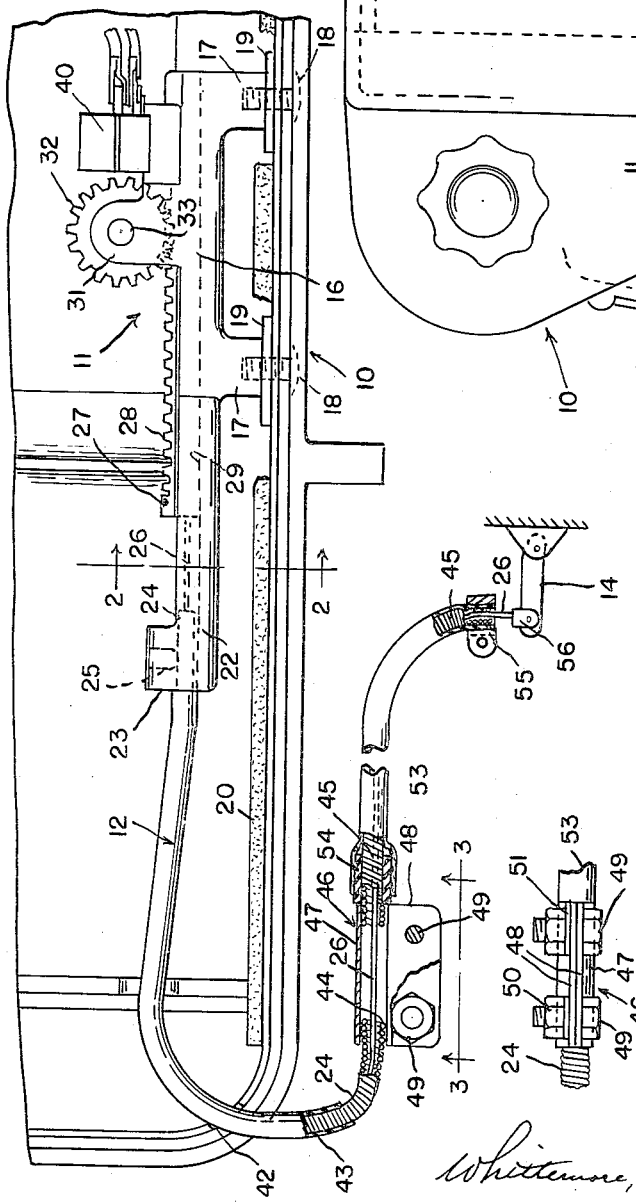
Dec. 20, 1960    A. F. MILLINGTON ET AL    2,964,968
FLEXIBLE CONDUIT COUPLING
Filed July 14, 1958
INVENTORS
ALFRED F. MILLINGTON
BY HOWARD B. DICKIE
ATTORNEYS

2,964,968

FLEXIBLE CONDUIT COUPLING

Alfred F. Millington, Northville, and Howard B. Dickie, Plymouth, Mich., assignors to Novi Equipment Company, Novi, Mich., a corporation of Michigan Filed July 14, 1958, Ser. No. 748,478

3 Claims. (Cl. 74—501)

The present invention relates to a flexible conduit device for the purpose of coupling a manually operated actuator device, which may be part of a control mechanism for an automotive air conditioning system such as constitutes the subject matter of our copending application, Serial No. 745,740, filed June 30, 1958, to an operated unit of one sort or another, shown in that application as being a by-pass valve. The subject device is particularly well suited for such use, in view of the fact that the invention deals with improved means for effecting such a coupling or connection from an operating part which is in an inaccessible location at the time the connection is made. Nevertheless it is to be understood that the principles of the invention are applicable in mechanisms of other types, in which there exists a difficulty of connecting a housed or otherwise inaccessible operating or like part to a unit operated thereby.

It is an object of the invention to provide a flexible cable connector or coupling device, comprising an actuator in the form of a slidable rack and a rotative pinion in mesh with the rack, which rack is connected in a novel manner by a flexible cable to a unit to be operated. In the setting of the invention, this unit is in a location remote from the rack and pinion operating device, which is enclosed in a casing, such as an evaporator housing, in a way to make it inaccessible at the time the installation of the evaporator structure is made, hence presents a problem in regard to the desired length of flexible cable for the particular installation; it being understood that the cable as initially applied to the rack of the operating device is in a standard, uniform length.

Another object is to provide coupling structure as described, including an operating device, preferably of the rack and pinion type or equivalent type, in which a rotative element in an inaccessible housed location is operated by a control knob externally of this location.

More specifically and in accordance with the invention, the flexible cable as initially applied in a standard length to the sliding rack of the operating device is brought externally of the housing, after which the necessary length of the cable to reach an operated unit without excess cable is then determined by cutting apart the usual protective coil or sheath of the cable at a point adjacent the housing exterior, then sliding the separated cable end off the usual internal operating wire, cutting the sheath to necessary and proper length to reach its point of anchoring adjacent the operated unit, restoring the thus cut cable portion on the wire, clamping the same to the closely adjacent end of the cable sheath as initially cut, and securing the wire projecting from the far, outer end of the cable to the operated unit.

Another object of the invention is to provide flexible cable conduit structure of this sort, in which the clamping of adjacent ends of the cable sheath is performed by a split tubular clamping clip of novel construction, which spans the short length of wire between adjacent sheath ends clamped thereby.

It will be seen from the foregoing that the invention also provides a novel method of connecting up the cable of an inaccessible control mechanism, as of a housed evaporator control device, at the time of installation of the latter, whereby a standard cable length may be easily and quickly proportioned properly, particularly as to the length of its sheath, to be brought to an operated unit without excessive bending of the cable.

The foregoing as well as other objects will become more apparent as this description proceeds, especially when considered in connection with the accompanying drawings illustrating the invention, wherein:

Fig. 1 is a fragmentary view in elevation, from the open rear end of an automotive air conditioning unit, of an operating device as connected in accordance with the invention to an operated unit, being partially broken away and in section;

Fig. 2 is a fragmentary view in end elevation of the evaporator housing, being partially broken away and in transverse vertical section along line 2—2 of Fig. 1; and Fig. 3 is a fragmentary view, as from the line 3—3 of Fig. 1, showing the improved clip connection of adjacent cable sheath ends, as contemplated by the invention.

Referring first to Figs. 1 and 2 of the drawings, the reference numeral 10 generally designates an evaporator housing of an air conditioning system of the type shown and described in our copending application, Serial No. 745,740 identified above. The rack and pinion control device of the invention, generally designated 11, is employed to operate the flexible cable 12 and is fixedly mounted in a way to be described within a restricted space 13 at the lower forward portion of the housing 10. So located, it is inaccessible from the exterior of the housing at the time of installation.

As shown in Fig. 1, flexible cable 12 is externally connected to a pivoted member 14 to operate the latter, which member may be considered to have the function of regulating a refrigerant circulating line, for example being a valve connected to the compressor suction line in by-passing relation around the compressor, as shown and described in our further copending application, Serial No. 748,436, filed July 14, 1958.

The rack and pinion control device 11 comprises a suitable fixed die-cast base 16 having integral feet 17 secured by screws 18 to a bottom panel of the housing 10 at the space 13, with gaskets 19 interposed. The reference numeral 20 is applied to further insulating and cushion gasket material having no connection to this invention.

A lateral extension 22 is formed integral with base 16, terminating in an upwardly projecting clamp nose 23, in which the conventional coiled outer sheath 24 of the flexible cable 12 is clamped by a set screw 25, the sheath 24 terminating inwardly of the nose 23. The flexible operating wire 26 of cable 12 extends from this point inwardly to a set screw or like connection at 27 with an elongated slidable rack member 28 sliding in an elongated groove or way 29 formed along the entire length of the top of body 16 and its extension 22.

A pair of upwardly projecting ears 31 are integrally formed on base member 16 in substantially laterally spaced relation to its clamp nose 23; and a pinion 32 is rotatably journalled in these ears in mesh with rack 28. This is done by operating stem 33 having bearing in ears 31, to which stem pinion 32 is fixedly secured, with a spacer 34 interposed between the pinion and an adjacent bearing ear 31. As shown in Fig. 2, the operating stem 33 extends forwardly through a control panel 36 of housing 10, where it has a rotatable control knob 37 fixedly applied thereto. The knob 37 has an indicator thereto for coaction with suitable calibration or other marking on the panel 36, and it will be seen that rotation of the knob 37 causes pinion 32 to shift the rack 28 in one direction or the other, and correspondingly move the operating wire 26 of cable 12 and the operated member 14.

As shown in Fig. 1 the base 16 of rack and pinion device 11 is provided, on one side of the pinion mounting ears 31, with integral extensions 39 of the latter, and an electrical switch 40 is mounted on these extensions, switch 40 being for the purpose described in our copending application, Serial No. 748,436, identified above. Thus device 11 operates both as a mechanical cable actuator and as a control component for an electrical circuit.

At the time of installation of the housing 10, as in the relatively limited and inaccessible space beneath the automobile dashboard which is contemplated to be the setting, the base 16 of rack and pinion device 11 will have been mounted in the housing, with a cable 12 of full standard length secured to its clamp nose 23, the cable being brought out through a rearward opening 42 in the housing wall. A protective insulating tube 43 of rubber may be sleeved over the cable from the base 11 to this external point, and it is to be understood that housing 10 is at this time fully enclosed.

As a first operation in connecting cable 12 to operated unit 14, its external coil or spiral sheath 24 is cut or broken at 44, as closely adjacent the housing as is convenient and practical. The elongated cut off sheath portion, specially designated 45, is then slid off the internal wire and is measured for minimum length to reach most directly and practically to the operated unit, i.e., without undue bends. Sheath portion 45 is cut to this length and is replaced on wire 26.

The inner end of this sheath portion is now brought reasonably closely adjacent the outer end of the other sheath portion 24, and a split clip 46 is applied to these ends, bridging the wire 26. Clip 46 is formed of a piece of spring metal to provide a substantially 360° clamp sleeve 47 encircling the sheath ends, and a pair of integral, plate-like flanges 48 projecting from the sleeve. Bolts 49 and nuts 50, with spring washers 51 interposed, are applied to aligned openings in the flanges 48 and are taken up to clamp tightly the ends of sheath portions 24 and 45, thus completing the coupling or connection adjacent housing 10.

A second rubber insulating tube 53 is slipped over the cable sheath 45, being preferably held in longitudinally fixed relation to the latter. This is accomplished by fitting the inner end of tube 53 onto a short, relatively rigid sleeve mount 54 surrounding and frictionally engaging sheath 45 adjacent its inner clamped end. Mount 54 is, for convenience, applied to the sheath prior to clamping the latter by clip 46.

The outer end of sheath 45 is clamped fixedly, as in a fixed anchor or support 55 adjacent operating unit 14, and the operating wire 26, as then or previously trimmed to proper length, is pivotally connected by a suitable clevis element 56 to the unit 14.

The described method of effecting the desired coupling is easily and quickly carried out at the time of installation of the evaporator in the limited available space, and with minimum inconvenience to the installer. Standard cable lengths may be used in installing evaporators in a wide variety of automobiles, and in many different arrangements of the components served by the cable. Actuator device 11 is a rugged, very compact and reliable one, particularly well suited to meet the limitations imposed by its location and its requirements as to function.

What we claim as our invention is:

1. Connecting and operating structure, comprising housing means enclosing a housing interior location normally inaccessible from the housing exterior, said housing means having an opening to an accessible zone at the exterior thereof, a member having a portion movable in said inaccessible location, to which portion an operating connection is to be made, an elongated connector including a continuous flexible wire connected at one end to said portion of said member at said inaccessible location and adapted to be connected at its opposite end to another member to transmit operating force between said members, and flexible sheath elements surrounding and extending longitudinally of said wire from said ends and anchored at termini of the elements adjacent said portion of said first member and said other member, respectively, one of said sheath elements extending from said inaccessible location through said opening to an accessible sheath end at said accessible zone, the other sheath element terminating in a sheath end adjacent but separated from said accessible sheath end, and a clip fixedly applied to said last named sheath ends in said accessible zone to clamp the same in fixed relation to one another, said clip spanning a portion of said wire between said last named ends.

2. Connecting and operating structure, comprising housing means enclosing a housing interior location normally inaccessible from the housing exterior, said housing means having an opening to an accessible zone at the exterior thereof, a member having a portion movable in said inaccessible location, to which portion an operating connection is to be made, an elongated connector including a continuous flexible wire connected at one end to said portion of said member at said inaccessible location and adapted to be connected at its opposite end to another member to transmit operating force between said members, and flexible sheath elements surrounding and extending longitudinally of said wire from said ends and anchored at termini of the elements adjacent said portion of said first member and said other member, respectively, one of said sheath elements extending from said inaccessible location through said opening to an accessible sheath end at said accessible zone, the other sheath element terminating in a sheath end adjacent but separated from said accessible sheath end, and a clip fixedly applied to said last named sheath ends in said accessible zone to clamp the same in fixed relation to one another, said cilp spanning a portion of said wire between said last named ends and having means adjacent the latter to draw the clip into clamping engagement therewith.

3. Connecting and operating structure, comprising housing means enclosing a housing interior location normally inaccessible from the housing exterior, said housing means having an opening to an accessible zone at the exterior thereof, a slidable rack member having a portion movable in said inaccessible location, to which portion an operating connection is to be made, an elongated connector including a continuous flexible wire connected at one end to said rack member portion at said inaccessible location and adapted to be connected at its opposite end to another member to transmit operating force between said members, and flexible sheath elements surrounding and extending longitudinally of said wire from said ends and anchored at termini of the elements adjacent said portion of said rack member and said other member, respectively, one of said sheath elements extending from said inaccessible location through said opening to an accessible sheath end at said accessible zone, the other sheath element terminating in a sheath end adjacent but separated from said accessible sheath end, and a clip fixedly applied to said last named sheath ends in said accessible zone to clamp the same in fixed relation to one another, said clip spanning a portion of said wire between said last named ends and having means adjacent the latter to draw the clip into clamping engagement therewith.

References Cited in the file of this patent

UNITED STATES PATENTS

| | | |
|---|---|---|
| 1,260,465 | Shakespeare et al. | Mar. 26, 1918 |
| 1,585,976 | Groves et al. | May 25, 1926 |
| 1,589,108 | Caretta | June 15, 1926 |
| 1,927,615 | Ponti et al. | Sept. 19, 1933 |
| 2,171,073 | Winning | Aug. 29, 1939 |
| 2,186,181 | Steinlein | Jan. 9, 1940 |
| 2,328,211 | Harper et al. | Aug. 31, 1943 |
| 2,631,469 | Oliner et al. | Mar. 17, 1953 |